A. BAUSCHLICHER.
GEARING.
APPLICATION FILED FEB. 5, 1910.

996,605. Patented July 4, 1911.

Witnesses:
Inventor
August Bauschlicher
By his Attorneys
Rogers & Kennedy

UNITED STATES PATENT OFFICE.

AUGUST BAUSCHLICHER, OF FRANKFORT-ON-THE-MAIN-SACHSENHAUSEN, GERMANY.

GEARING.

996,605.  Specification of Letters Patent.  Patented July 4, 1911.

Application filed February 5, 1910. Serial No. 542,165.

*To all whom it may concern:*

Be it known that I, AUGUST BAUSCHLICHER, a subject of the Emperor of Germany, residing at Stegstrasse 64, Frankfort-on-the-Main-Sachsenhausen, Germany, have invented certain new and useful Improvements in Gearing, of which the following is a specification, reference being had therein to the accompanying drawing.

This invention relates to gear wheels of the type in which the engaging elements or teeth are in the form of friction members, the object of the invention being to produce a wheel of this character provided with a plurality of sets of engaging elements to adapt the wheel to coöperate with a plurality of driven wheels.

With this end in view, my invention consists of a gear wheel, comprising, in combination, opposing plates or disks and a plurality of sets of friction elements mounted between the plates, whereby each set of elements may coöperate with a separate and distinct driven member.

The invention consists also in the manner of mounting the friction members in the wheel.

Figure 1:
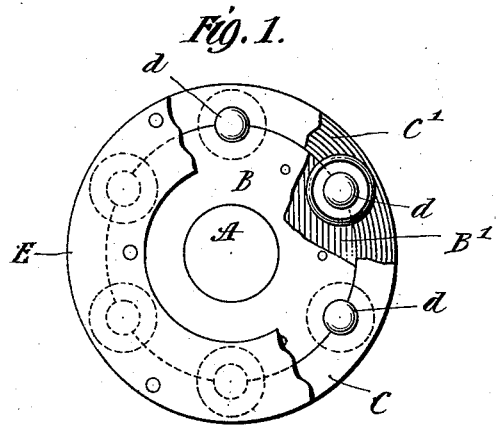
Figure 2:
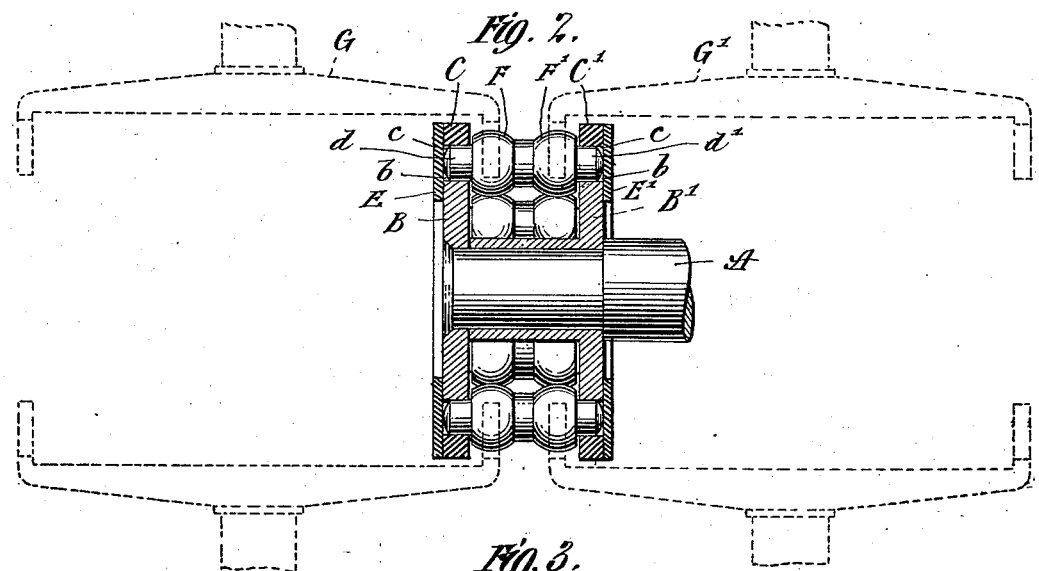
Figure 3:
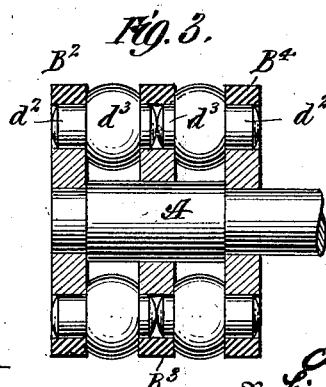

In the accompanying drawings:—Figure 1 is a side elevation of my improved wheel, portions being broken away to expose other parts to view. Fig. 2 is a longitudinal sectional elevation of the same. Fig. 3 is a similar view of a modification.

Referring to Figs. 1 and 2, A represents a shaft or hub, to which are firmly and fixedly attached two radially extending plates B, B', spaced apart from each other and provided in their peripheries at intervals with semi-circular bearing notches $b$, those in one plate being arranged opposite to and in alinement with the notches in the opposite plate.

C, C', represent confining rings adapted to surround the outer edges of the plates B, B', and provided each with semi-circular notches $c$ in their inner edges, adapted to register with the notches in the respective plates B, B', so as to form conjointly, a series of circular bearing openings, the parts thus described constituting in effect opposing plates with bearing openings at intervals.

F, F', represent two sets of preferably spherical friction elements provided on their ends with studs or journals $d$, $d'$, which are seated in the opposing bearing openings in the plates B, B', in such manner that the friction elements may rotate freely on longitudinal axes parallel with the axis of the shaft A. The ends of these journals are preferably rounded, as shown, and are adapted to abut against circular thrust plates E, E', applied to the outer sides of the plates B, B', respectively, and over the bearing openings formed conjointly by the plates and surrounding confining rings, the said thrust plates thus acting to receive the end thrust to which the friction members are subjected, the rounded ends of the journals causing the friction between them and the thrust plates to be reduced to a minimum.

The two sets of friction elements thus mounted are adapted to coöperate with two driven wheels G, G', shown by dotted lines in Fig. 2, the individual friction elements of the sets engaging between the teeth of the driven wheels respectively, and in this manner imparting motion to both of said wheels. By reason of the fact that the friction elements are mounted to rotate in the bearing openings, the contact between these elements and the teeth of the driven wheels will be of a rolling character and free from friction.

In Fig. 3, I have shown my improved wheel in modified form. In this case, there are three plates or disks $B^2$, $B^3$, $B^4$, between which the two sets of friction elements are mounted. The individual elements of one set are in this case disconnected from the individual elements of the other set, so that the elements of the two sets are rotatable independently of each other. Each friction element, in order to adapt it to be mounted in this manner, is formed with a spherical body portion and oppositely extending journals or studs $d^2$ and $d^3$, the outer studs $d^2$ being mounted in bearing openings in the outer plates, and the inner studs $d^3$ of the elements of the two series being mounted end to end in bearing openings in the central plate, so that the individual elements of the two sets are disposed with their axes in line, similar to the arrangement of Fig. 3, but with the elements disconnected from each other. By constructing the wheel in this manner and mounting the friction elements therein, as shown, the number of sets of friction elements may be increased by applying additional supporting plates, and mounting the journals of the additional elements in bearing openings in the plates in line with the other journals.

While I have illustrated and described my invention in the different forms which now occur to me, it is to be understood that the invention is not limited to any particular form or construction of the parts except in so far as such details are specified in the claims.

It will be observed that the two sets of spherical friction elements are spaced apart from each other a sufficient distance to permit of the extension of the teeth of the driven wheels side by side and in proper driving relation to the friction elements, as shown in Fig. 2.

Having thus described my invention, what I claim is:—

1. A gear wheel comprising in combination opposing plates, a plurality of sets of spherical driving elements mounted between the plates, each set adapted to be engaged with its own individual coöperating member, and an intermediate instrumentality for spacing the several sets of driving elements apart a sufficient distance to adapt them to be so engaged.

2. A gear wheel comprising in combination, opposing plates formed at intervals with bearing openings, and a plurality of sets of friction elements provided with journals mounted in the bearing openings, the friction elements of one set being disconnected from those of another set and rotatable independently of each other.

3. A gear wheel consisting of opposing disks formed in their outer edges with open bearing sockets, a series of friction elements having journals seated in the sockets, and confining rings surrounding the peripheries of the disks and having sockets to receive the journals of the friction elements.

4. In a gear wheel, the combination with opposing disks and removable rims formed in their adjacent faces with complementary bearing openings, of a series of friction elements provided with journals mounted in said bearing openings.

In testimony whereof I have affixed my signature in presence of two witnesses.

AUGUST BAUSCHLICHER.

Witnesses:
JEAN DICHMANN,
JEAN BOPP.

---

Copies of this patent may be obtained for five cents each, by addressing the "Commissioner of Patents, Washington, D. C."